June 28, 1960
D. KALLMAN
2,943,035
APPARATUS FOR REFUELING A NUCLEAR REACTOR
Filed Sept. 27, 1955
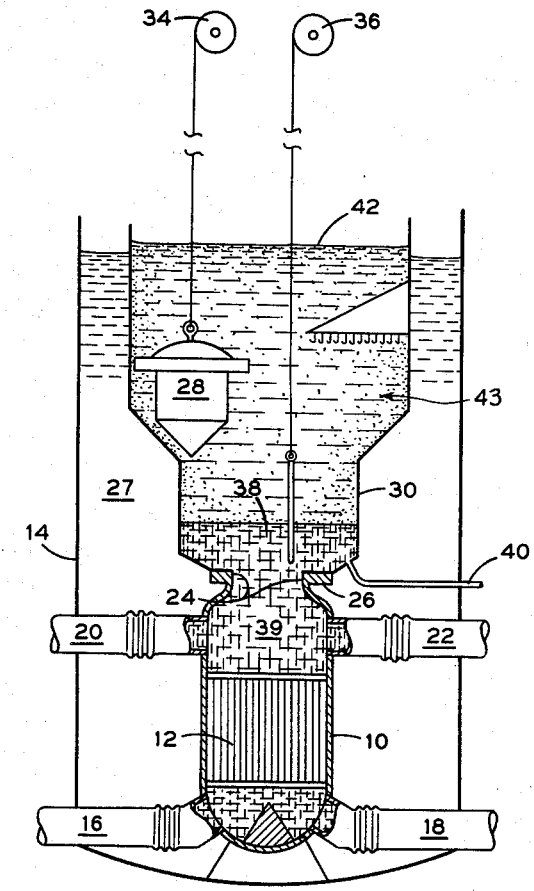
*INVENTOR.*
Donald Kallman
BY
ATTORNEY

United States Patent Office 2,943,035
Patented June 28, 1960

2,943,035
APPARATUS FOR REFUELING A NUCLEAR REACTOR

Donald Kallman, New York, N.Y., assignor to The Babcock & Wilcox Company, New York, N.Y., a corporation of New Jersey Filed Sept. 27, 1955, Ser. No. 536,860

1 Claim. (Cl. 204—193.2)

The present invention relates in general to nuclear reactors, and more particularly, it relates to a method and apparatus for refueling a heavy water cooled nuclear reactor.

Most power production reactors must be refueled at periodic intervals, for instance every three or four months. In order to perform the refueling, a closure member is removed from the pressure vessel to expose the fuel elements. These elements may then be removed. However, the radiation intensity from the depleted fuel elements is extremely high and this requires that any unloading or serviceing apparatus be operated from a remote shielded position.

The present invention provides a method and apparatus for refueling a heavy water cooled reactor in which the reactor is shielded by a fluid shield above the fuel opening in the pressure vessel. The reactor vessel is situated in the lower portion of a large containment vessel and has a removable flanged closure at its upper end which allows access to the fuel elements. In the upper portion of the containment vessel there is disposed, superjacent the reactor vessel, a refueling shielding tank. This tank preferably has a circular cross section and is attached to the reactor vessel so that upon removal of the reactor closure there is direct communication between the upper refueling shielding tank and the interior of the reactor. Normally, the space between the containment vessel and the reactor pressure vessel is filled with light water which acts as a lateral radiation shield. When the refueling operation is to begin the lower portion of the refueling shielding tank is filled with heavy water to a point just covering the closure member. The tank is then filled with a transparent organic type fluid having a density less than the heavy water and which acts as a shield. Remote refueling means are then positioned over the top of the refueling shielding tank so as to perform the refueling operation through the fluid.

The various features of novelty which characterize the invention are pointed out with the particularity in the claims annexed to and forming a part of this specification. For a better understanding of the invention, its operating advantages and specific objects attained by its use reference should be had to the accompanying drawing and descriptive matter in which I have illustrated and described a preferred embodiment of my invention.

A pressurized heavy water nuclear reactor 10 having a core of nuclear fuel plate assemblies 12 disposed therein is centrally located in the lower portion of a reactor containment tank 14. The reactor is provided with primary coolant fluid inlets 16 and 18 and outlets 20 and 22 each of which passes through the wall of the containment vessel 14. In the upper portion of the reactor there is a reactor fueling opening 24 bounded by the flange 26 of the reactor vessel and arranged to receive a pressure vessel closure 28. Disposed superjacent the reactor vessel there is an elongated reactor fuel shielding tank 30 having circular cross sections and normally fixedly attached by a fluid tight connection to the flange 26. Light water 27 fills the space 32 between the reactor vessel and refueling shielding tank and the walls of the container 14.

A remote fuel handling and service means including lifting pulleys 34, 36 is arranged above the refueling shield tank 30 in such a manner as to service the reactor. Usually this remote mechanism is laterally moveable to perform any of the mechanical operations necessary to open and close the reactor as well as changing fuel elements, from a position above the refueling shielding tank. A manually operated winch on a trolley may under simplified conditions perform this operation.

The refueling is accomplished by first filling the lower portion of the tank 30 to a level 38 just above the top of the closure member 28 with heavy water 39 by flowing the heavy water in through the drain line 40. Above this heavy water the tank is filled to a proper level as indicated by numeral 42 with a clear organic type liquid 43 which is immiscible with water, such as diphenyl and liquid silicones. The diphenyl provides a large thickness of material for shielding purposes. The remote refueling apparatus is then moved over the opening in the refueling shielding tank 30 and it removes the closure member 28 from the reactor opening 24 by working through the transparent fluid shield. The closure member 28 is stored in the tank and the fuel elements are then shifted or removed from the heavy water individually and hung on the rack provided in the shield tank. The level 38 of the heavy water is high enough to allow the fuel elements from the core 12 to be shifted in position without exposing them to the shielding liquid.

Upon completion of the fuel servicing, the remote operated servicing means replaces the closure member 28 while the fluid shield is in place.

By providing the refueling shielding tank above the reactor opening there is no loss of the heavy water into the light water of the container vessel and only a minimum quantity of the very expensive heavy water is used. Additionally, the large depth of the shielding fluid provides a transparent shield which allows a lightly shielded remote fuel handling apparatus to work therethrough. Visual contact is maintained during fuel handling and considerably reduces the cost of fuel handling.

As the heavy water is a poor shielding agent the shielding integrity of the system is maintained by the use of only a small quantity of heavy water and a very large quantity of immiscible colorless organic type fluid to result in a net shielding greater than could be accomplished with the heavy water alone.

The small amount of heavy water which is used in the refueling operation can be recovered and purified in any of the well-known methods, such as the freezing recovery system and the organic fluid may be stored elsewhere during the inbetween fueling periods. Also during the operation of the reactor the refueling shielding tank may be filled with light water to provide the necessary vertical shielding.

While in accordance with the provisions of the statutes, I have illustrated and described herein a specific form of the invention now known to me, those skilled in the art will understand that changes may be made in the form of the apparatus disclosed without departing from the spirit of my invention covered by my claim, and that certain features of the invention may sometimes be used to advantage without a corresponding use of the other features.

I claim:

In combination, a reactor containment tank, a body of light water in said tank, a nuclear reactor having a vertically elongated reactor vessel within said tank and open at its upper end, a group of vertically arranged elongated highly radioactive fuel elements in the lower part of said vessel, a body of heavy water in said vessel arranged to cool said fuel elements, an elongated shield tank of circular cross section open at its ends and attached at its lower end to said vessel to provide a confined volume within the containment tank above said reactor opening and in direct communication with said heavy water, said tank extending above the height of said body of light water, a body of heavy water in said shield tank and reactor vessel above said fuel elements during reactor refueling having a height at least as great as the length of said fuel elements, a body of liquid silicone above said body of water as a radiation shield, and a fuel element handling device above said vessel opening arranged to operate within said shielding tank to shift the position of said radioactive fuel elements while maintaining their submergence in heavy water.

References Cited in the file of this patent

UNITED STATES PATENTS

| | | |
|---|---|---|
| 2,736,696 | Wigner et al. | Feb. 28, 1956 |
| 2,770,591 | Wigner et al. | Nov. 13, 1956 |

OTHER REFERENCES

"Scientific American," December 1951, pages 30, 31, 32.

"Nucleonics," November 1951, pages 5–17.

"Nucleonics," November 1952, pages 56–60.

"Proceedings of the International Conference on the Peaceful Uses of Atomic Energy," held in Geneva, August 8–20, 1955, vol. 2, Physics; Research Reactors, United Nations, N.Y. (1956), pages 259–265.